US005893964A

United States Patent [19]

Claveau

[11] Patent Number: 5,893,964

[45] Date of Patent: Apr. 13, 1999

[54] DEVICE FOR SUBLIMATING A DECORATION ON THE SURFACE OF AN OBJECT OF ANY SHAPE

[76] Inventor: Jean-Noël Claveau, Coisia, Arinthod, France, 39240

[21] Appl. No.: 08/980,067

[22] Filed: Nov. 26, 1997

Related U.S. Application Data

[62] Division of application No. 08/765,255, Feb. 26, 1997, Pat. No. 5,798,017.

[30] Foreign Application Priority Data

Jun. 30, 1994 [FR] France ........ 94 08317

[51] Int. Cl.[6] ........ B32B 31/00

[52] U.S. Cl. ........ 156/382; 156/240; 156/285

[58] Field of Search ........ 156/382, 285, 156/286, 583.3, 230, 240

[56] References Cited

U.S. PATENT DOCUMENTS

| | | | |
|---|---|---|---|
| 3,793,115 | 2/1974 | Jindra | 156/382 X |
| 3,868,901 | 3/1975 | Valiela | 156/540 X |
| 4,078,962 | 3/1978 | Krueger | 156/583.3 X |
| 4,247,355 | 1/1981 | Friedrick et al. | 156/583.3 X |
| 4,314,814 | 2/1982 | Deroode | 156/238 X |
| 4,407,685 | 10/1983 | Hankland | 156/230 X |
| 4,670,084 | 6/1987 | Durand | 156/230 X |
| 5,308,426 | 5/1994 | Claveau | 156/234 |
| 5,322,665 | 6/1994 | Bernardon et al. | 156/382 X |
| 5,468,346 | 11/1995 | Bruce et al. | 156/104 X |
| 5,507,896 | 4/1996 | Yoshimura et al. | 156/382 X |

*Primary Examiner*—James Engel
*Attorney, Agent, or Firm*—Dowell & Dowell, P.C.

[57] ABSTRACT

A device for sublimating a decoration on a surface of an object including opposing elastic membranes sealed at their peripheral edges and capable of elastic deformation in all directions when the device is placed under vacuum.

4 Claims, 7 Drawing Sheets

DEVICE FOR SUBLIMATING A DECORATION ON THE SURFACE OF AN OBJECT OF ANY SHAPE

CROSS REFERENCE TO RELATED APPLICATION

This application is a divisional application of Ser. No. 08/765,255 filed Feb. 26, 1997, now U.S. Pat. No. 5,798,017 entitled DEVICE FOR SUBLIMATING A DECORATION ON THE SURFACE OF AN OBJECT OF ANY SHAPE.

BACKGROUND OF THE INVENTION

1. Field of the Invention

The present invention relates to improvements regarding a device for sublimating a decoration on the surface of an object of whatsoever shape in order to increase the production and the quality of the objects to be decorated.

2. History of the Related Art

In the art are known machines of such type, generally consisting of two hinged rigid frames, in which one of the sides is integral with a membrane capable of elastic deformation. An inker, an object and a second inker are inserted into the machine between the two membranes. The machine is placed under vacuum so that the inkers, and in particular their decorated surfaces, are pressed against the surface of the object to be decorated. The assembly maintained under pressure is placed in a furnace, e.g., an electric one, for sublimating the decoration over a few millimeters of depth on the surface of the object.

This type of machine presents, however, some disadvantages with respect to the rigid frames which, when placing the machine under vacuum, precludes a perfect deformation of the elastic membranes and of the inkers, causing a clearance at the contact points on the object. When the decoration is transferred, this clearance between the object and the inkers results in a not decorated line at the contact point, which is detrimental to the quality of the object.

SUMMARY OF THE INVENTION

The particular aim of the present invention is to remedy these disadvantages.

The device in accordance with the present invention comprises at least one elastic membrane retained by sealing means and capable of elastic deformation in all directions when the device is placed under vacuum.

The membranes are made out of a material such as silicone or polyester, so as to withstand temperatures reaching 250° or more.

BRIEF DESCRIPTION OF THE DRAWINGS

By way of example, the accompanying drawings will allow a better understanding of the invention, of the characteristics it presents and of the advantages it is likely to bring.

DESCRIPTION OF THE PREFERRED EMBODIMENT

Figure 1:
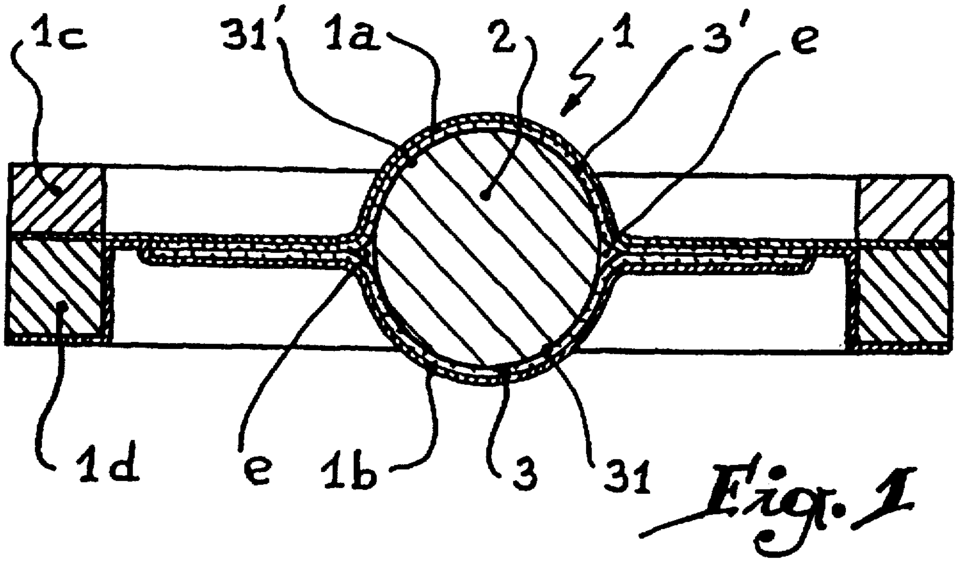
Fig. 1 PRIOR ART
FIGS. 1 and 2 are views of the previous state-of-the-art type showing the disadvantages when transferring the decoration to the surface of the object.
Figure 2:
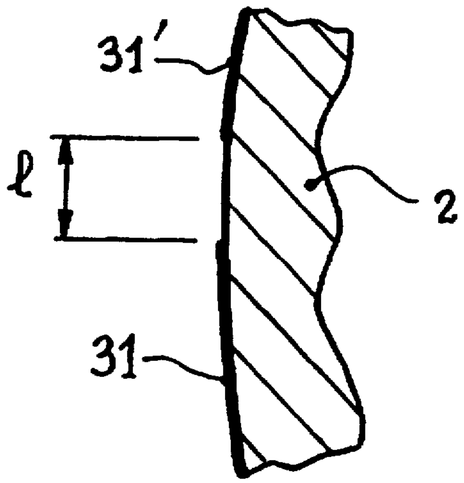
PRIOR ART Fig. 2
Figure 3:
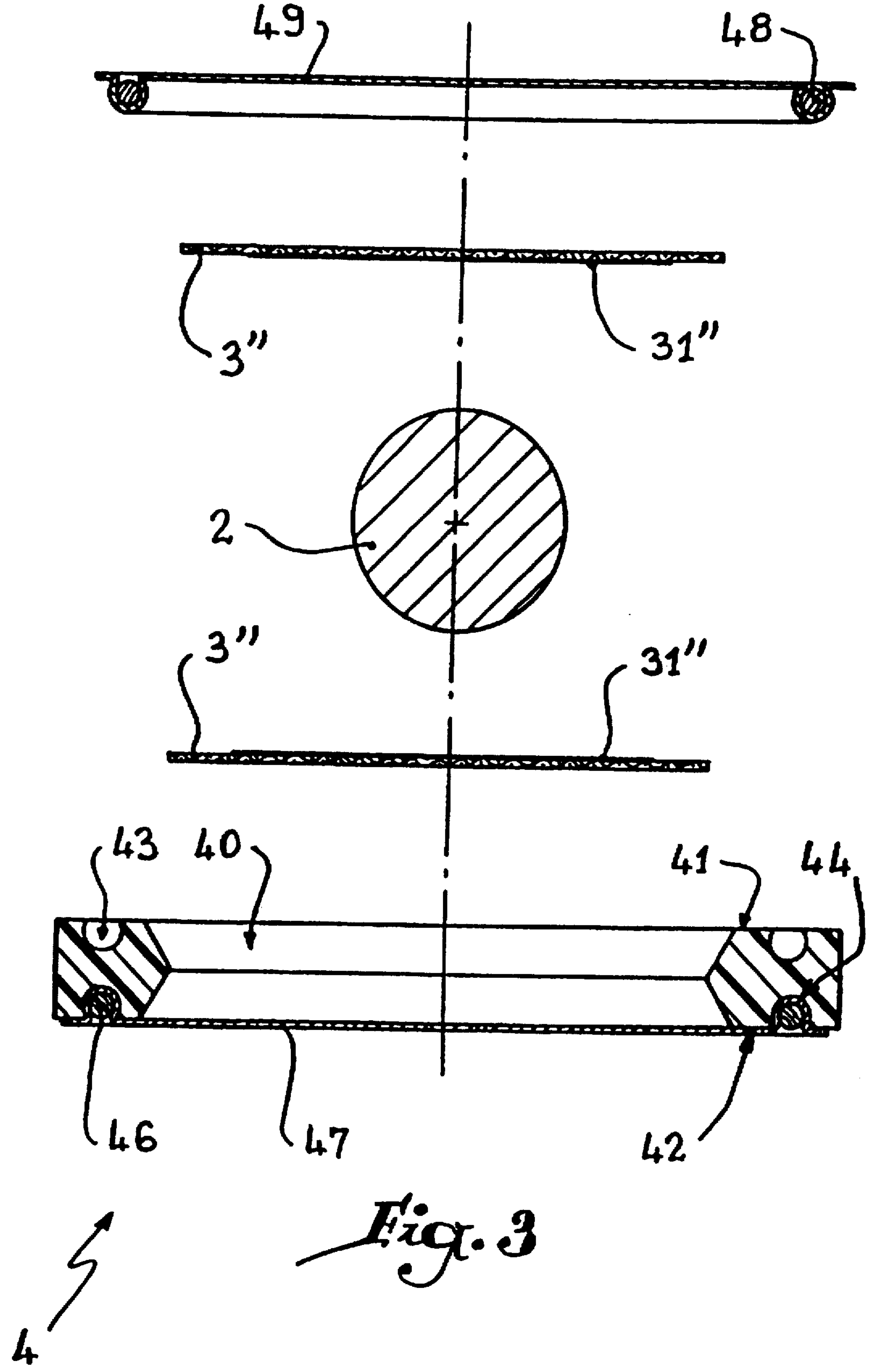
FIG. 3 is an exploded view showing the decorating device in accordance with the present invention.

FIGS. 1 and 2 show a decorating device 1 of the previous state-of-the art type, comprising an upper membrane 1*a* and a lower membrane 1*b*, each attached to a rigid frame 1*c* and 1*d*, respectively, swivelling with respect to each other.

Prior to closing the frames 1*c* and 1*d*, an inker 3, an object 2 and another inker 3' were inserted between the membranes 1*a* and 1*b*. Each inker 3, 3' is provided with a surface that is covered with an identical decoration 31, 31' that will come into contact with the surface of the object 2 to be decorated. The decorating device 1 is then placed under vacuum, deforming the membranes 1*a* and 1*b* and the inkers 3, 3' so that the decorations 31, 31' are pressed against the object 2. The device 1 is inserted into a hot environment to enable the transfer of the decoration 31, 31' of each inker 3, 3' to the surface of the object 2.

When the device 1 is placed under vacuum it can be noted that the deformation of the membranes 1*a* and 12 does not suffice for the inkers 3, 3' and, in particular, for the decorations 31, 31' to come into contact with the object 2, wherefore a blank space e is left the contact point. Moreover, the pressure increase in the device 1 brings about very rapidly the rupture of the membranes 1*a* and 1*b* at the points where they are affixed to the rigid frames 1*c* and 1*d*. Thus, after the sublimation of the decoration 31, 31', it can be observed that around the entire border of object 2 runs a not decorated continuous line of variable width 1. It goes without saying, that this line diminishes to a great extent the quality of the decorated objects and that, therefore, they cannot be offered for sale in such a condition.

FIGS. 3 to 7 show a device in accordance with the present invention, by means of which the entire surface of object 2 can be decorated.

Figure 6:
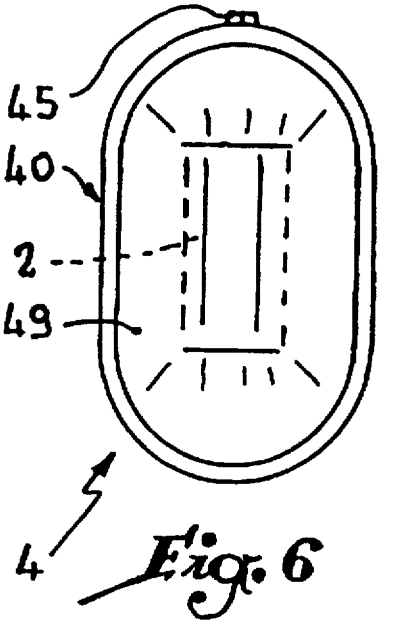
Figure 7:
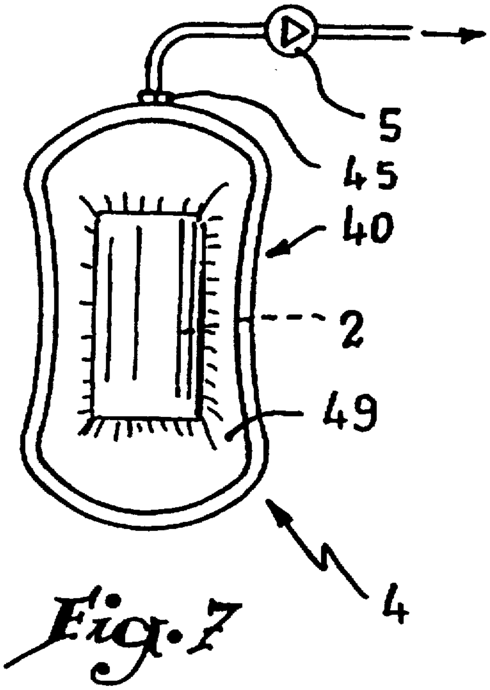

The device 4 is comprised by an elastically deformable frame 40, made out of a plastic material, such as, e.g., silicone, that is resistant to high temperatures. The frame 40 comprises an upper surface 41 and a bottom surface 42 that are provided with a round or analogous groove around the entire frame. The frame 40 is perpendicularly pierced between the grooves 43 and 44 with a hold not represented herein, that permits the tight fitting of a metal connecting piece 45, the function of which will be better seen later (FIGS. 6 and 7).

The groove 44 provided on the bottom surface 42 of the frame 40 is intended to house under pressure a retaining ring 46 of the same shape, that is provided in order to tightly retain the peripherical border of an elastic membrane 47. The membrane 47 is made of a material, such as silicone, identical to the one used for the frame 40.

The groove 43 on the upper surface 41 is provided for the housing of another retaining ring 48 for the tight fitting of the peripherical border of another membrane 49, identical to membrane 47.

The retaining rings 46 and 48 are long enough to encircle the entire periphery of the frame 40.

Prior to installing the second membrane 49, the operator positions on the first membrane a first inker 3" in such a manner that its decoration 31" does not come into contact with the membrane. Thereafter, the object 2 is placed on the decoration 31" of the first inker 3" while a second inker 3" is placed in such a manner that its decoration 31" is in contact with said object 2. The inkers 3" are identical and made out of an elastic material, such as fabric, knitted fabric or a thin sheet of a not woven material.

Figure 4:
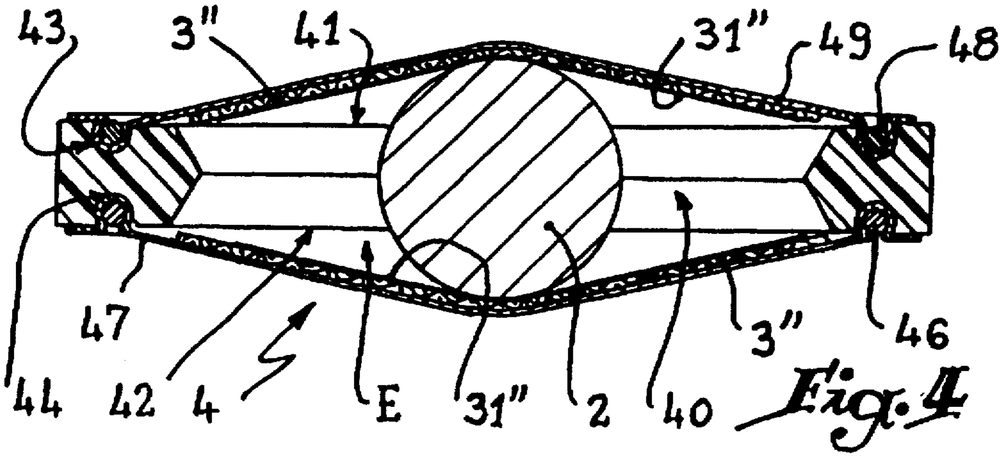
FIGS. 4 to 7 are drawings representing the elastic deformation of the device when it is placed under vacuum.

Lastly, the operator positions the second membrane 49 in such a manner that it attaches to the retaining ring 48 on the upper surface of the frame 40 to constitute a completely sealed interior space E (FIGS. 4 and 6).

Figure 5:
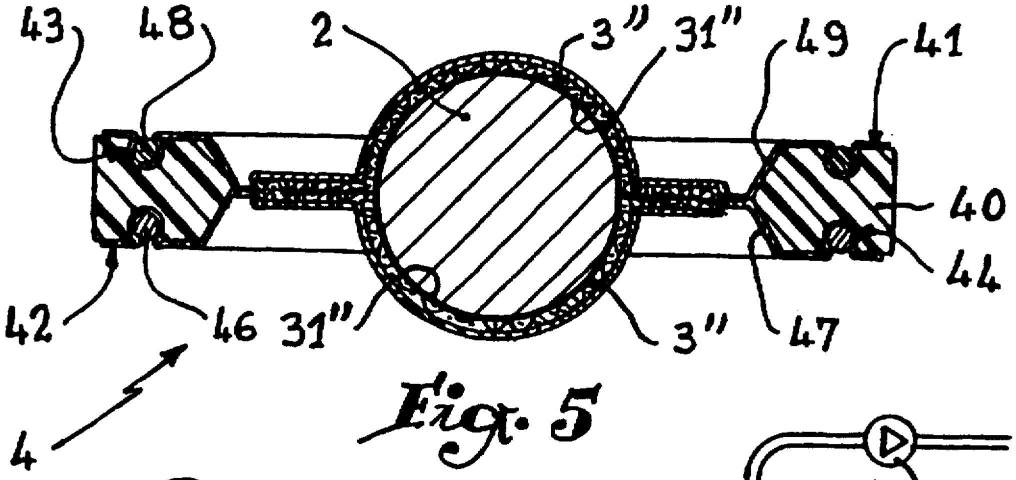

The device 4 is connected to a vacuum pump 5 by means of a connecting piece 45 in order to generate a depression in the space E, limited by the frame 40 and the membranes 47, 49 (FIGS. 5 and 7).

It can be observed that with a sufficient vacuum, the frame 40 becomes distorted in its middle so that the membranes 47, 49 and the inkers 3" correspond in shape to the shape of the object 2, even at the contact point.

The device 4 is placed inside of a furnace that has been preheated to a temperature of roughly 180 to 200° so that all the decorations 31" of the inkers 3" are transferred to the surface of the object 2 to be decorated.

FIGS. 8 to 14 illustrate variants of the embodiment of the device shown in FIGS. 3 to 7. In these drawings, the elements corresponding to those of FIGS. 3 to 7 are referenced by the same figures and the same indexes.

Figure 8:
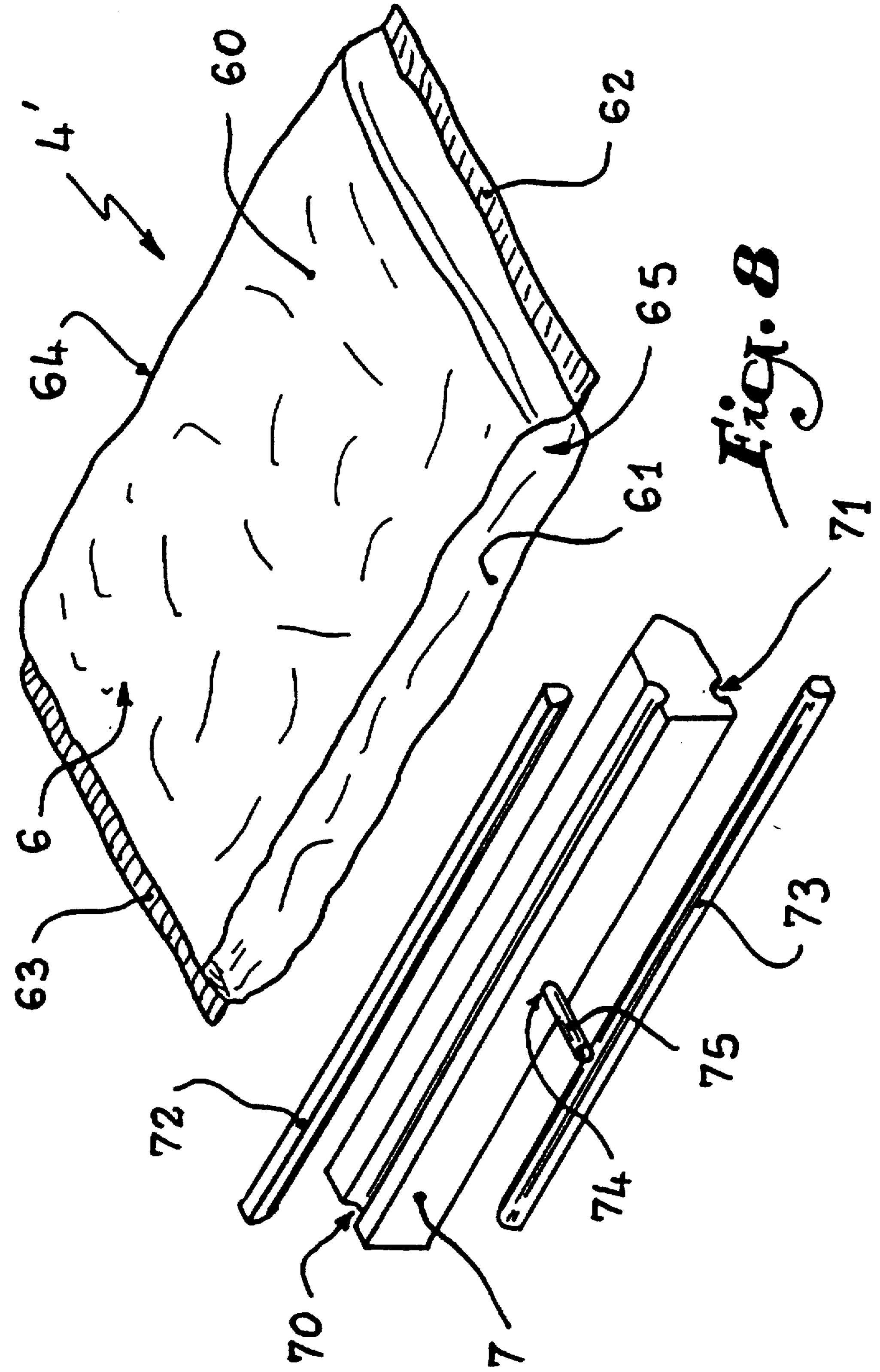
FIGS. 8 to 10 are drawings showing a first variant of the device in accordance with the invention.
Figure 9:
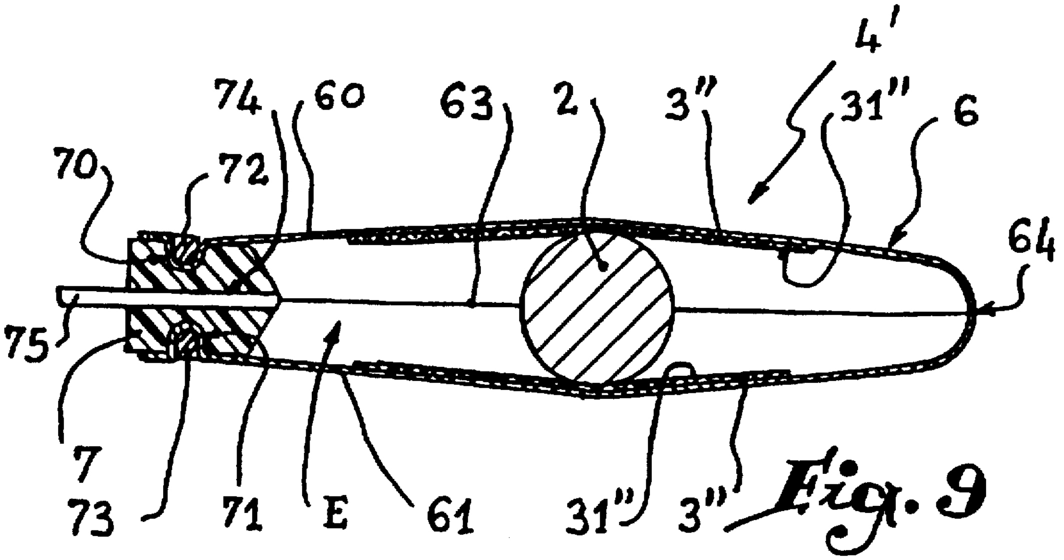
Figure 10:
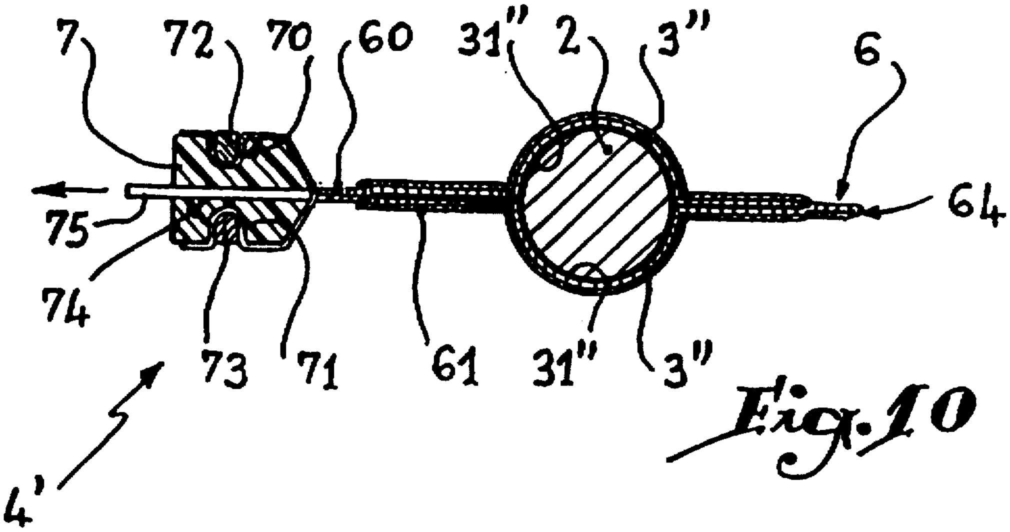

The aim of the variant shown in FIGS. 8 to 10 consists in providing a device 4' in which the elastic membrane 6 has the shape of a sealed pouch as replacement of the two membranes 47 and 49 of device 4.

The elastic membrane 6 is folded in such a manner that it forms two parallel sections 60, 61 having the same surface area.

The superimposed borders 62, 63 of each section 60, 61 perpendicular to the pleat 64 of the membrane 6 are welded or glued so as to constitute a sealed pouch. By way of example, the borders 62 and 63 are glued with a cold silicone paste capable of perfectly withstanding extensive deformations and high temperatures.

On the opposite side of the pleat 64 is provided an aperture 65 for the placing of the inkers 3" and the object 2 to be decorated inside of the elastic membrane 6. The inkers 3" are positioned in such a manner that their decorations 31" are in contact with the outer surface of the object 2.

The aperture 65 of the membrane 6 interacts with a rod 7 so as to tightly close the membrane.

The rod 7 is provided with two grooves, an upper one 70 and a bottom one 71, that are provided for the insertion of the retaining rings 72 and 73. The retaining rings 72, 73 hold the free extremities of the sections 60, 61 in the grooves 70, 71, respectively, in order to close the membrane 6 and constitute the sealed space E. The rod 7 is perpendicularly pierced and between the grooves 70 and 71 with a hole that permits the tight fitting of a metal connecting piece 75, identical to the one designated by reference number 75.

In same manner as above, the connecting piece 75 is connected to a vacuum pump that allows the obtaining of a depression inside the membrane 6, in such a manner that the sections 60, 61, the inkers 3" and the decorations 31" correspond in shape to the shape of the object 2, and in particular at the contact point. The device 4' is placed inside a preferably preheated furnace in order to effectuate the transfer of the decorations onto the surface of the object 2.

Figure 11:
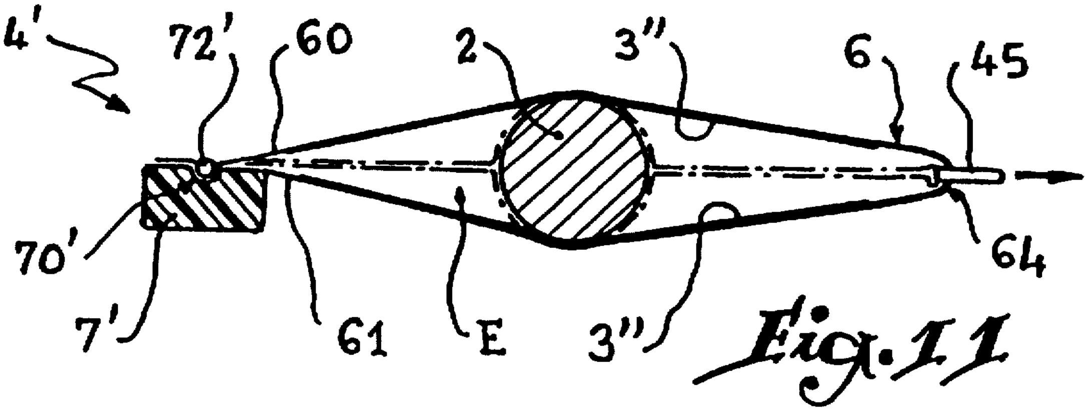
FIG. 11 is a diagrammatic view showing a variant of the fastening of the device shown in FIGS. 8 to 10.

FIG. 11 shows a variant of the rod 7, referenced 7', that allows the tight sealing of the elastic membrane 6. The rod 7' presents on its upper surface a groove 70' that has a greater depth than groove 70 provided for rod 7. The groove 70' is designed to hold the two free extremities of the sections 60 and 61 of the elastic membrane 6. The fixation of the sections 60 and 61 in the groove 70' is effectuated by a retaining ring 71', ensuring the tightness of the space E.

The membrane 6 interacts with a metal rod 45 that can be fastened either in the pleat 64 or on one of the borders 62, 63 prior to the gluing of same. It is understood that, before the positioning of the rod 7', the operator proceeds in the above-described manner to insert the object 2 and the inkers 3".

It must be noted that the rods 7 and 7' are made out of a material such as silicone or the like in order to undergo an elastic deformation when the device is placed under vacuum.

Figure 12:
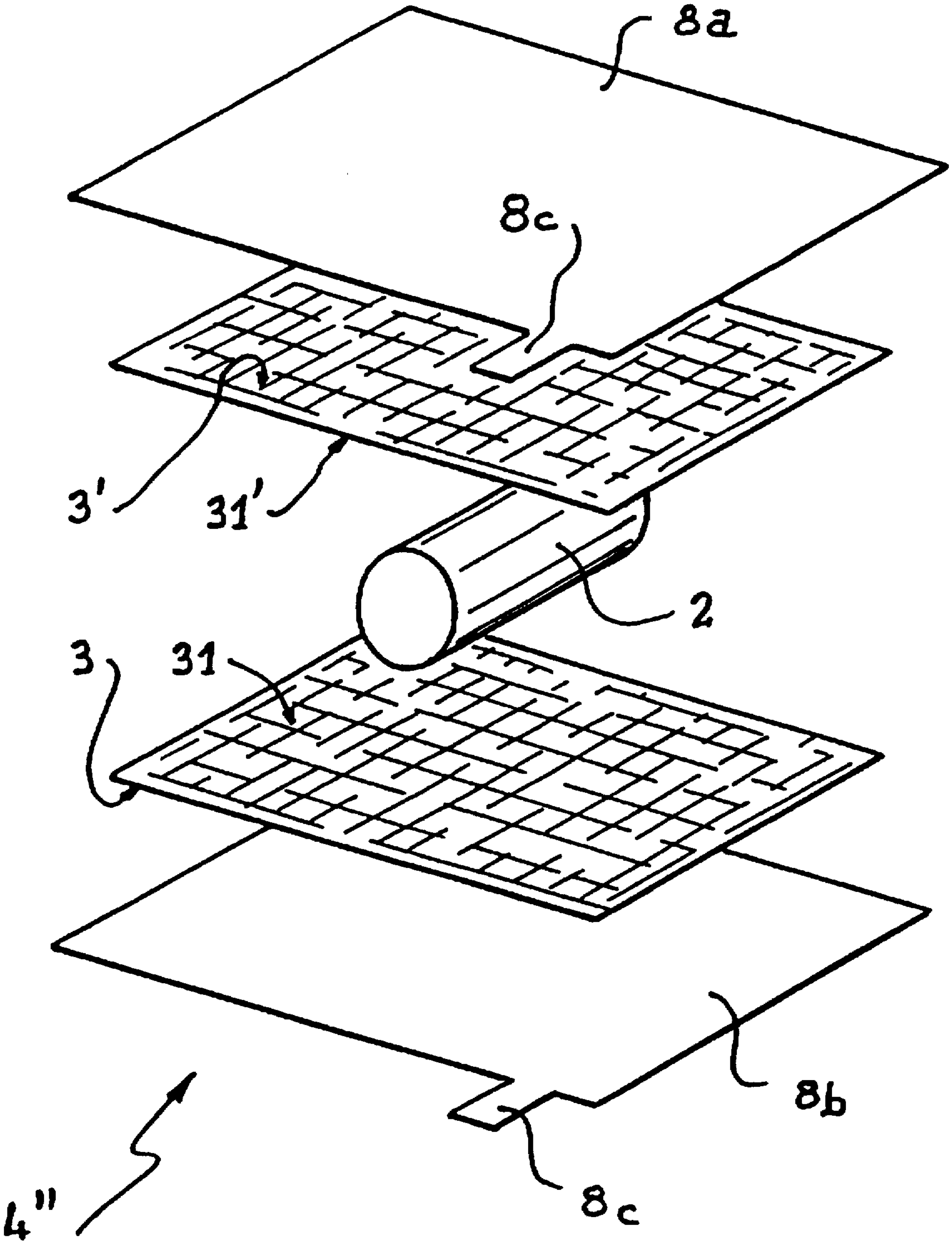
FIGS. 12 to 14 arc drawings showing a second variant of the device illustrated in FIG.
Figure 13:
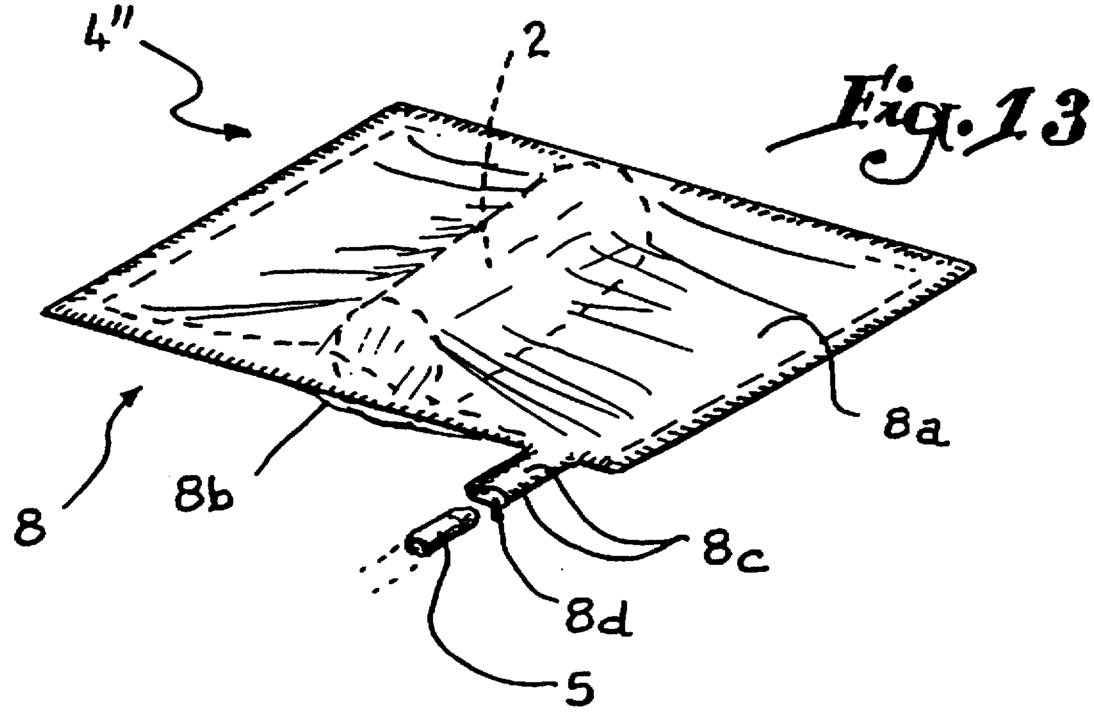
Figure 14:
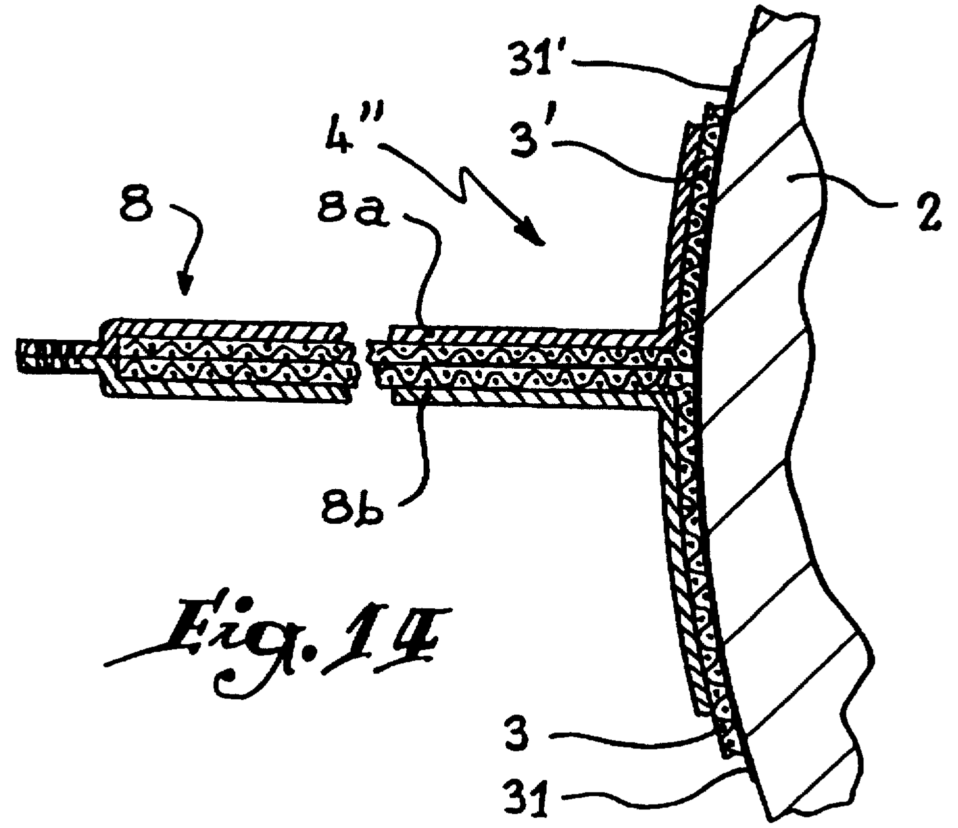

FIGS. 12 to 14 show a second variant of the device 4, herein referenced as 4", that comprises a pouch 8 constituted by two air-tight superimposed membranes 8*a*, 8*b*, deformable under depression and resistant to temperatures fluctuating between 180° and 200°. The membranes 8*a*, 8*b* are of identical geometrical shape and are made out of a material such as polyester or any other synthetic material. The membranes 8*a*, 8*b* are very thin and preferably cut in such a manner as to present a surface that suffices to cover object 2. Each of the membranes 8*a*, 8*b* is provided on one of their borders with a tongue 8*c*, the reason for which will be better seen farther on.

The operator places a first inker 3" on membrane 8*b* in such a manner that its decoration 31" is turned to the opposite side of the membrane. After having placed the object 2 on the first inker 3", the operator positions a second inker 3" so that its decoration 31" comes into contact with the mentioned object.

The second membrane 8*a* is designed to cover the entire assembly in such a manner that its peripherical borders come into contact with those of the lower membrane 8*b*. The borders of each of the membranes 8*a*, 8*b* are welded to each other so that the pouch 8 is completely sealed. The tongue 8*c* is welded in such a manner so as to leave an aperture 8*d* which would allow the connecting of the pouch 8 to the vacuum pump 5 (FIG. 13).

When a vacuum is obtained inside of the pouch 8, it can be observed that the deformation of the membranes 8*a*, 8*b* is sufficient for the inkers 3" and the decorations 31" to be perfectly pressed against the surface of the object 2 and, in particular, at its contact point (FIG. 14). In a known manner, the pouch 8 is then placed in a furnace for the transfer of the decorations 31" over the entire surface of the object 2.

It must be further understood that the foregoing description was given only by way of example and that it does not limit at all the entire scope of the invention that would be respected even if the described details of manufacture would be replaced by any other similar details of embodiment.

What is claimed is:

1. An apparatus for transferring ink decoration by sublimation to an outer surface of an object, the apparatus comprising; first and second elastic membranes each having border portions which are adapted to be sealed to one another after an object is placed therebetween, each of said first and second membranes including a tongue extending from said border portions, said tongues being adapted to being sealed to one another after an object has been placed between said first and second membranes to thereby define a port through which air can be withdrawn from between said first and second membranes, and a pair of inkers positioned between said first and second membranes, said inkers being of a size to engage an object disposed therebetween on generally opposite sides of the object, whereby said border portions of said first and second membranes are weldable to one another to thereby form an evacuation pouch after the object has been placed therebetween and between said pair of inkers.

2. The apparatus of claim 1 in which each of said pair of inkers is of a size such that said pair of inkers extends completely about the outer surface of the object.

3. The apparatus of claim 2 in which said first and second membranes are formed of a polyester material.

4. The apparatus of claim 1 in which said first and second membranes are formed of a polyester material.

* * * * *